Oct. 2, 1945.  A. O. WILLIAMS  2,386,023
BRAKE CONSTRUCTION
Filed March 23, 1944  4 Sheets-Sheet 3
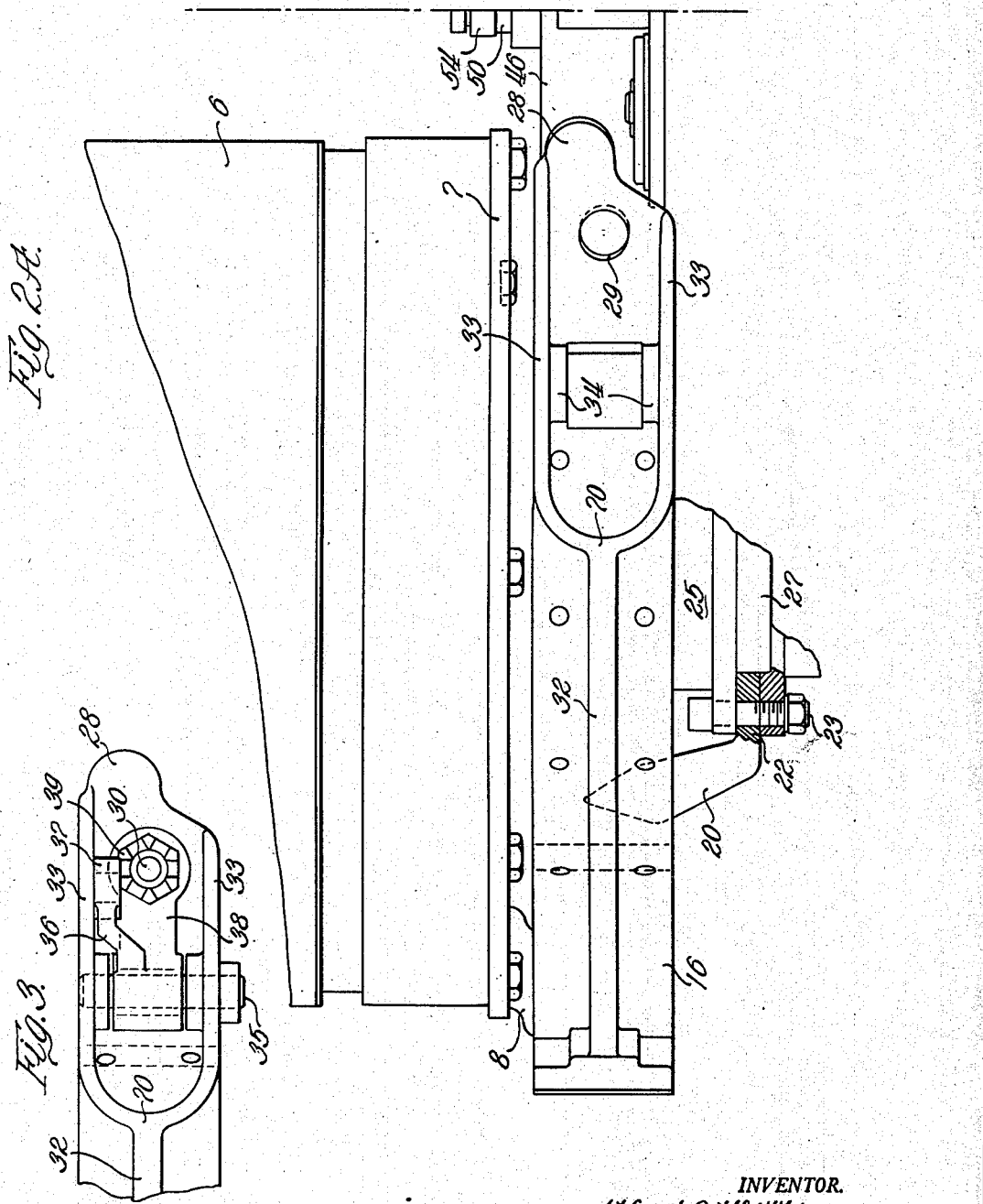
INVENTOR.
Alfred O. Williams
BY Walter E. Schirmer Oct. 2, 1945.  A. O. WILLIAMS  2,386,023
BRAKE CONSTRUCTION
Filed March 23, 1944  4 Sheets-Sheet 4

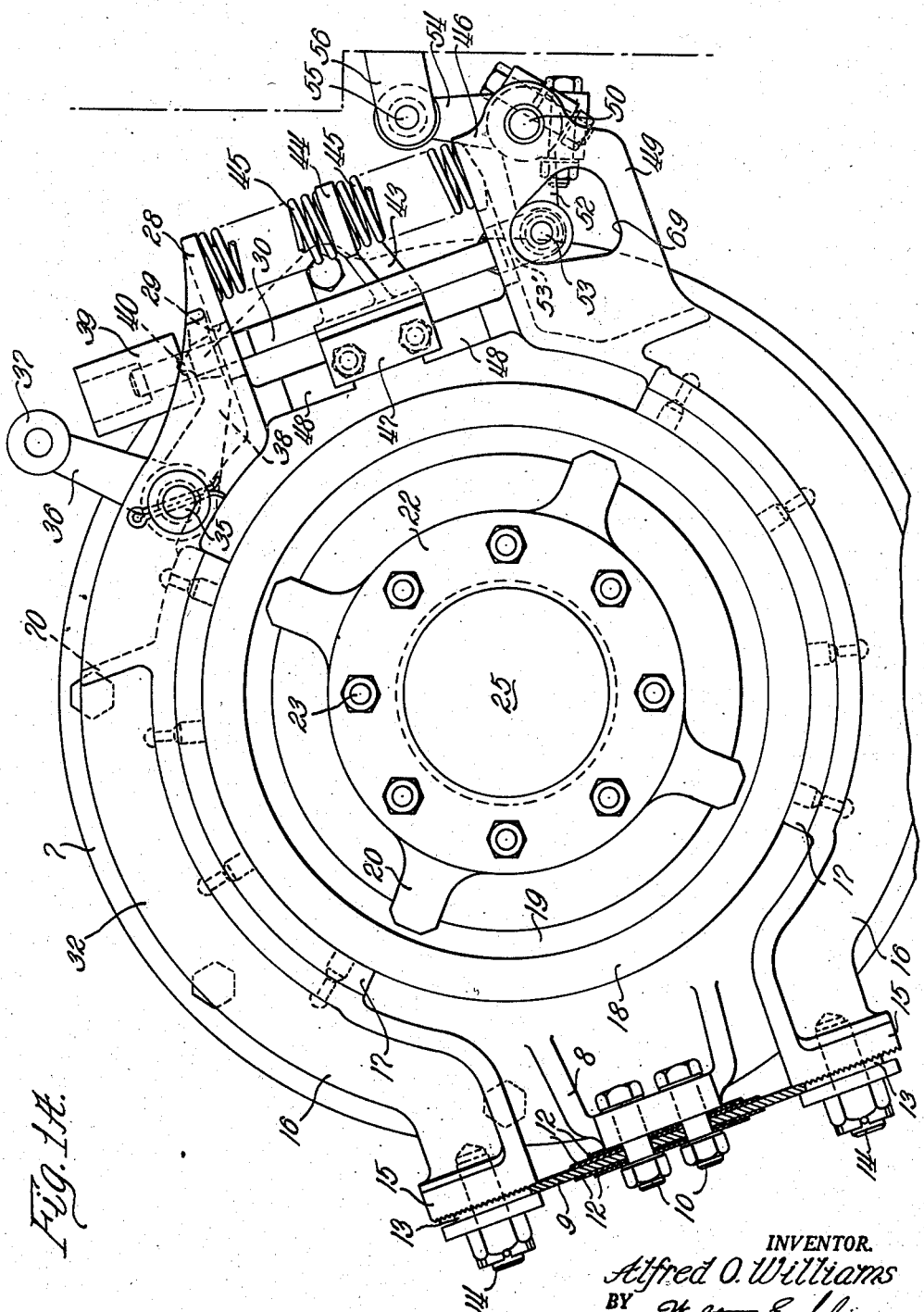

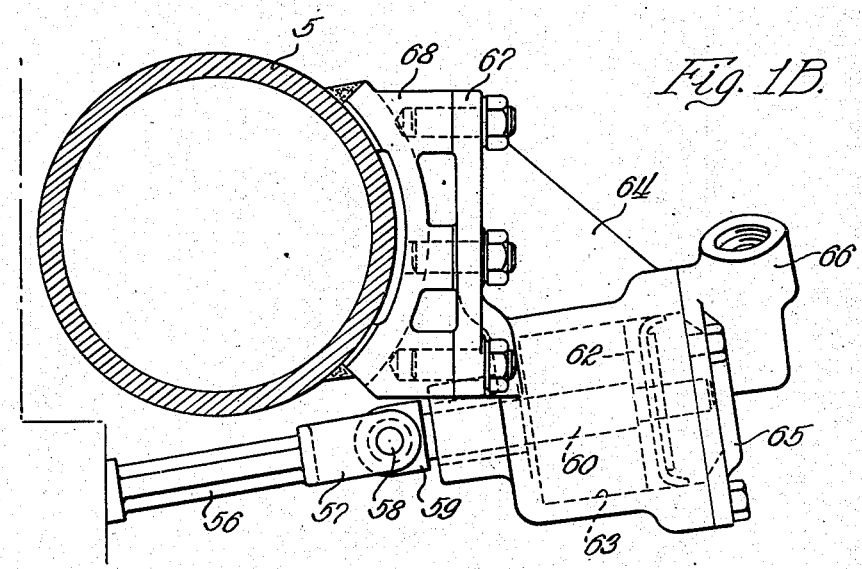
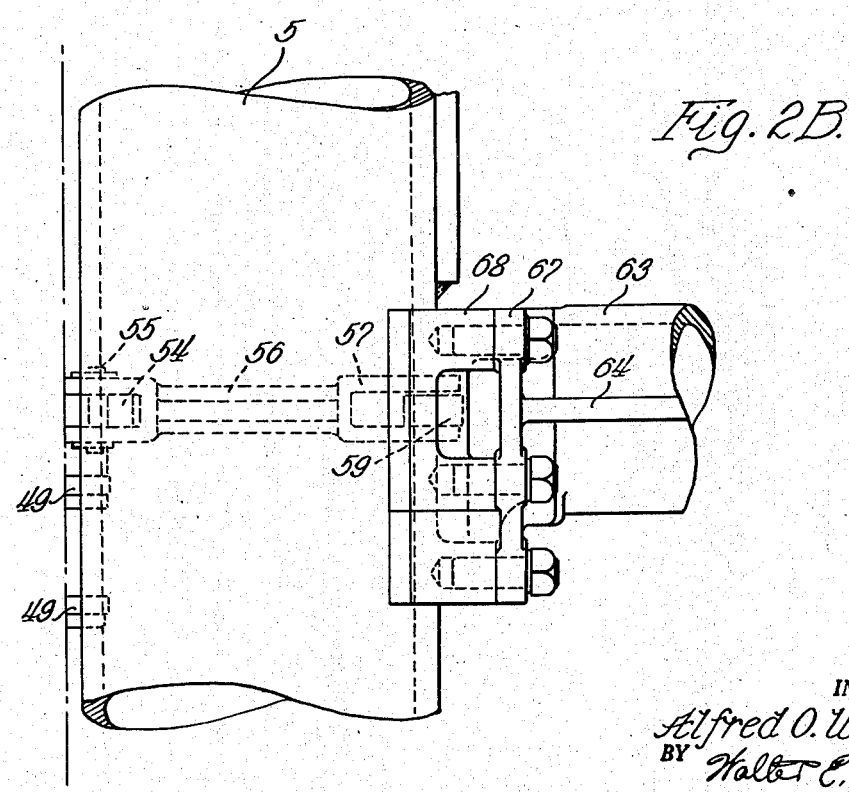

INVENTOR.
Alfred O. Williams
BY Walter E. Schirmer
Atty.

Patented Oct. 2, 1945

2,386,023

UNITED STATES PATENT OFFICE 2,386,023

BRAKE CONSTRUCTION

Alfred O. Williams, Battle Creek, Mich., assignor to Clark Equipment Company, Buchanan, Mich., a corporation of Michigan Application March 23, 1944, Serial No. 527,809

8 Claims. (Cl. 188—153)

This invention relates to brakes, and more particularly is concerned with the provision of a motor shaft brake for use on street car trucks and similar vehicles where the motor is carried in the truck and drives the axle through a propeller shaft.

It is a primary object of the present invention to provide a brake construction mounted on the motor shaft at the end of the motor housing including a brake drum and a pair of brake shoes normally held out of brake-engaging position but operable through either automatically or manually controlled means for applying the brakes.

One of the features of the present invention is the provision of a fluid actuated operating mechanism which is mounted on the outboard side of the side frame member of the truck providing ready access to the mechanism for purposes of inspection and maintenance, with the brake construction so arranged that it can be applied to existing trucks as well as to new trucks, and requiring no modification of any of the structural portion of the truck.

Still another advantage of the present invention is the provision of a brake mechanism of this type which is self equalizing in application and in which the brake shoes are anchored resiliently to a bracket secured to the motor housing. The resilient mounting is made adjustable to take up for wear and is easily accessible for this purpose.

Another object of the present invention is to simplify such type of brake construction, to reduce the number of parts and yet provide positive braking action.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1A is an end elevational view of the brake mechanism applied about the motor shaft;

Figure 1B is a continuation of Figure 1A showing the brake applying mechanism and its relation to the side frame of the truck;

Figure 2A is a top plan view of the brake construction shown in Figure 1A;

Figure 2B is a top plan view of the construction shown in Figure 1B;

Figure 3 is a detail view of the mounting arrangement for the manual control mechanism;

Figure 4:
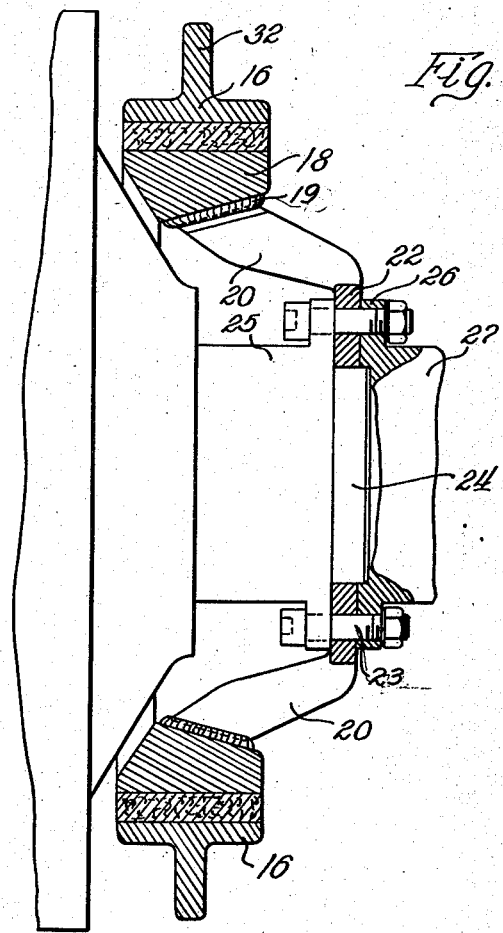
Figure 4 is an elevational view, partly in section, illustrating the manner in which the brake drum is secured to the motor shaft.

Referring now in detail to the drawings, the Figures 1A and 1B illustrate the braking mechanism as applied to a truck of the type shown in Burrows et al. Design Patent No. 116,112 issued August 8, 1939. This truck includes tubular side frame members 5 between which extends a suitable bolster supporting the car body.

On opposite sides of the transverse bolster arrangement which is carried by a swing link support from the side frame members are electric motors indicated at 6 in Figure 2A, which motors have secured to the end face thereof a plate member 7 having a bracket portion 8 adapted to support a spring member 9 which is bolted to the face of the bracket 8 by means of the bolts 10. On opposite sides of the spring member 9 there are provided successive leaf spring elements 12 for the purpose of distributing the stress evenly over the member 9. The opposite ends of the member 9 are slotted as indicated at 13 to receive studs 14 by which the serrated ends 15 of the brake shoes 16 are secured to the spring member 9. The opposite sides of the slotted ends 13 of the spring member 9 are correspondingly serrated whereby longitudinal adjustment of the ends 15 of the brake shoes can be obtained by loosening the studs 14 and shifting the brake shoes longitudinally relative the supporting member 9.

The shoes 16 are arcuate in shape and are provided on the inner surfaces with brake lining 17 adapted to have a braking engagement with a brake drum 18, the brake drum 18 having a tapered inner annular surface 19 welded or otherwise suitably secured to the arms 20 of a spider 22 bolted as by means of the bolts 23 to the motor shaft as indicated in detail in Figure 4.

Referring to this figure, the shaft 24 which is the driving shaft of the motor 6 has secured thereon the sleeve 25 which is keyed or otherwise non-rotatably secured to the shaft. The bolts 23 extend through flanges on the sleeve 25, through the hub portion of the spider 22, and through a flange 26 of the propeller shaft 27 which extends to the driving axle.

At the free end of the upper brake shoe 16 shown in Figure 1A there is provided a substantially normally extending boss portion 28 provided with an aperture 29 through which the link 30 extends. The upper shoe 16 is provided with a reinforcing rib 32 which, adjacent the end 28, flares out into two side ribs 33 defining therebetween a boss portion 34 adapted to form a support for a pivot pin 35 as shown in Figure 3 which supports a bell crank lever 36 having an eye portion 37 at the projecting end thereof adapted to be connected through a flexible cable or the like to any suitable hand brake operating mechanism such, for example, as that shown in Burrows & Williams Patent 2,221,075 issued November 12, 1940. The opposite end of the bell crank 37 indicated at 38 is extended between the end 28 of the brake shoe and an adjustable nut 39 mounted on the end of the link 30. The nut 39 is provided with an arcuate relief in which the boss 40 of the bell crank arm 38 rides, whereby upon counterclockwise rotation of the bell crank 36 upward tension is exerted upon the link 30.

Figure 5:
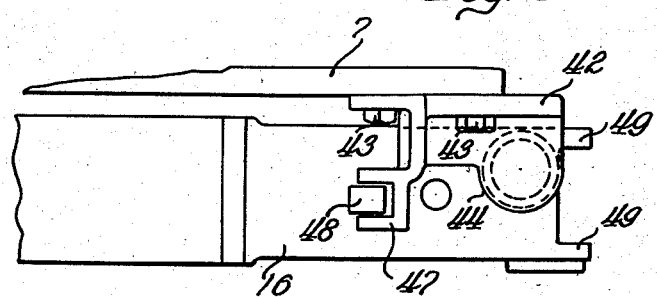
Figure 5 is a plan view of the bracket between the free ends of the brake shoe showing the manner in which this bracket maintains the shoes in alinement.

Bolted on the mounting plate 7 which carries the brake shoe opposite the bracket 8 is a second bracket 42 which is secured to the plate 7 as by means of the studs 43 indicated in Figure 5. The bracket 42 is provided with an extension 44 forming an intermediate support for oppositely extending coiled springs 45 biased between the fixed support 44 and the ends 28 and 46 of the brake shoes 16. Preferably suitable bosses are provided on opposite faces of the support 44 and on the adjacent faces of the ends 28 and 46 of the brake shoes to provide seats for preventing displacement of the springs 45. The bracket 42 is also provided with an offset channel-shaped extension 47 within which is received the extending lugs 48 carried by the inner faces of the ends 28 and 46 of the brake shoes. The lugs 48 have sliding engagement in the channel 47 as indicated in Figure 5, thereby holding the two shoes in planar alinement with the center plane of the brake drum 18.

The lower brake shoe 16 which is provided with the forged end 46 is also provided with spaced downwardly extending flanges 49 between which is supported the pivot pin 50 upon which is mounted a crank arm 52 having pivotal connection at its free end as indicated at 53 with the lower end of the link 30 through a clevis 53' welded to the lower end of link 30. A second crank arm 54 is also mounted on the pivot pin 50 and at its free end is pivotally connected as indicated at 55 to a lever 56 which in turn has, as shown in Figure 1B, a clevis end 57 pivotally connected at 58 to the end 59 of a piston rod 60 carrying the piston 62 mounted within the cylinder 63 formed in the bracket 64. The cylinder 63 is closed by an end plate 65 carrying a suitable boss 66 adapted to receive a conduit for conducting fluid under pressure to the head end of the cylinder 63. The bracket 64 is provided with a flanged portion 67 bolted or otherwise secured to the pad 68 which is welded or otherwise suitably secured to the outer surface of the frame side member 5.

In the operation of the mechanism thus far described the admission of fluid under pressure to the head end of cylinder 63 results in movement of the piston 62 to the left as shown in Figure 1B. This results in counterclockwise rotation of the crank arm 54 which, in turn, rotates the pin 50 and consequently produces counterclockwise rotation of crank 52 keyed to the pin 50. Rotation of the crank 52 results in a downward pull being exerted on the link 30, the flanges 49 of the brake shoe 16 being apertured as indicated at 69 to accommodate the ends of the pin 53. Downward movement of the link 30 results in pressure being applied through the nut 39, bell crank arm 38 and end 28 of brake shoe 16 to apply the upper brake shoe to the surface of the drum 18. At the same time a reaction is produced on the pin 50 resulting in upward pressure being exerted on end 46 of the lower brake shoe 16, thereby moving the free ends of the brake shoes 16 toward each other against the pressure of spring 45 to apply the shoes to the drum 18. This results in braking action being imposed upon the motor shaft and the propeller shaft 27, thereby braking the driving connection to the truck. The spring plate 9 being resilient accommodates this movement of the shoes into braking engagement, and the adjustment of the ends 15 of the shoe on the plate accommodates wear of the brake linings so that the shoes will always engage over their entire surface.

Upon release of pressure in the cylinder 63 the springs 45 act to spread the shoes apart, which action through the crank arms 52 and 54 in turn return the piston 62 to the position shown in Figure 1B.

It is desirable that some manually operable means be provided for actuating the brakes in the event of failure of the fluid pressure system or when the vehicle is to be parked without power being connected thereto such as in a repair barn or the like. For this purpose the bell crank 36 is provided, this bell crank as previously described being connected through a flexible cable to any type of hand brake operating mechanism. Upon actation of such mechanism the bell crank is rotated in a counterclockwise direction about its pivot pin 35, resulting in upward movement of arm 38 of the bell crank applying a force against the nut 39 through the boss 40 and thereby tending to move the link 30 upwardly. This produces tension on the link 30 tending to draw the lower brake shoe upwardly due to the connection of the link 30 to the pin 50. At the same time the reaction produced at the pivot point 35 of the bell crank tends to move the upper brake shoe 16 downwardly, thereby forcing the two brake shoes into braking engagement through operation of the hand brake mechanism. The merging connection of the flanges 33 of the upper shoe 16 as indicated at 70 forms a suitable stop in the event that the bell crank 36 is rotated beyond a limiting position.

Suitable adjustment is provided for the free ends of the shoes by the use of the adjustable nut 39 which is preferably hexagonal in shape as shown in Figure 3 so that it may be threaded inwardly or outwardly on the link 30 to adjust the brake shoes in proper position relative the drum 18 and to provide a predetermined spring pressure on the shoes and associated mechanism so that all the parts will be held under proper tension to prevent rattling or looseness.

By mounting the cylinder assembly and piston on the outboard side of the frame side member 5 it will be apparent that these parts are easily accessible from the side of the truck and can be readily inspected for maintenance or repair.

Also it will be noted that the plate 7 which carries the brake shoes which in turn carry the crank arms 52 and 54 as well as the bell crank 36 provided a ready means of supporting the entire braking assembly on the end plate of the motor. This accommodates the use of this braking mechanism on installations already in service, since the drum 18 can be readily mounted on the motor shaft in the manner shown in Figure 4 or in any other desired manner so that the brake mechanism can be applied to trucks of the type shown in the design patent referred to above.

I am aware that various changes may be made in certain details of the present construction, and I therefore do not intend to be limited except as defined by the scope and spirit of the appended claims.

I claim:

1. A motor shaft brake construction comprising a drum, a pair of brake shoes encircling said drum and resiliently anchored at one end, said shoes having their free ends normally urged away from each other toward brake releasing position, bell crank means pivotally mounted on the free ends of each shoe, one of said bell crank means being connected at one end to an actuator, a link interconnecting the other end of said one bell crank means to the other brake shoe, whereby operation of said actuator rotates said one bell crank means to force said shoes into braking engagement with said drum.

2. The construction of claim 1 including a cylinder, and a piston within said cylinder responsive to fluid pressure therein for operating said actuator.

3. The construction of claim 1 including means interconnecting one end of said other bell crank means and said link whereby rotation of said other bell crank means actuates said shoes independently of said actuator.

4. The construction of claim 1 wherein said link has its one end connected to said other brake shoe through adjustable nut means, and said other bell crank means has one end interposed between said nut means and said other brake shoe to move conjointly therewith, said other bell crank means being arranged for manual operation from a remote point.

5. In a brake construction for a rail truck, a side frame member, a motor mounted adjacent to and on the inboard side of said member, a cylinder and piston assembly mounted on the outboard side of said member, a motor shaft having a brake drum thereon, a mounting plate on the end of said motor, a pair of brake shoes resiliently anchored on said plate and encircling said drum, spring means normally urging the free ends of said brake shoes apart, a link extending between said ends and having abutment against one end of one of said brake shoes, a bell crank pivotally mounted in the end of the other brake shoe and having one arm connected to said link, and actuating means between the other arm of said bell crank and said piston.

6. The combination of claim 5 including guide means carried by said plate, and means on the free ends of said shoes engaging in said guide means for maintaining said shoes in planar alinement with said drum.

7. The combination of claim 5 including a second bell crank pivotally mounted on the free end of the other brake shoe and having one arm arranged for conjoint movement with said link, the other arm being arranged for connection to a remotely disposed manual operating means.

8. The combination of claim 5 wherein said link extends through said one brake shoe, and adjustable nut means provides an abutment for moving said shoe conjointly with said link in brake applying direction.

ALFRED O. WILLIAMS.